Sept. 10, 1940.   G. B. GALLASCH   2,214,367
MICROSCOPE
Filed March 24, 1939   2 Sheets-Sheet 1
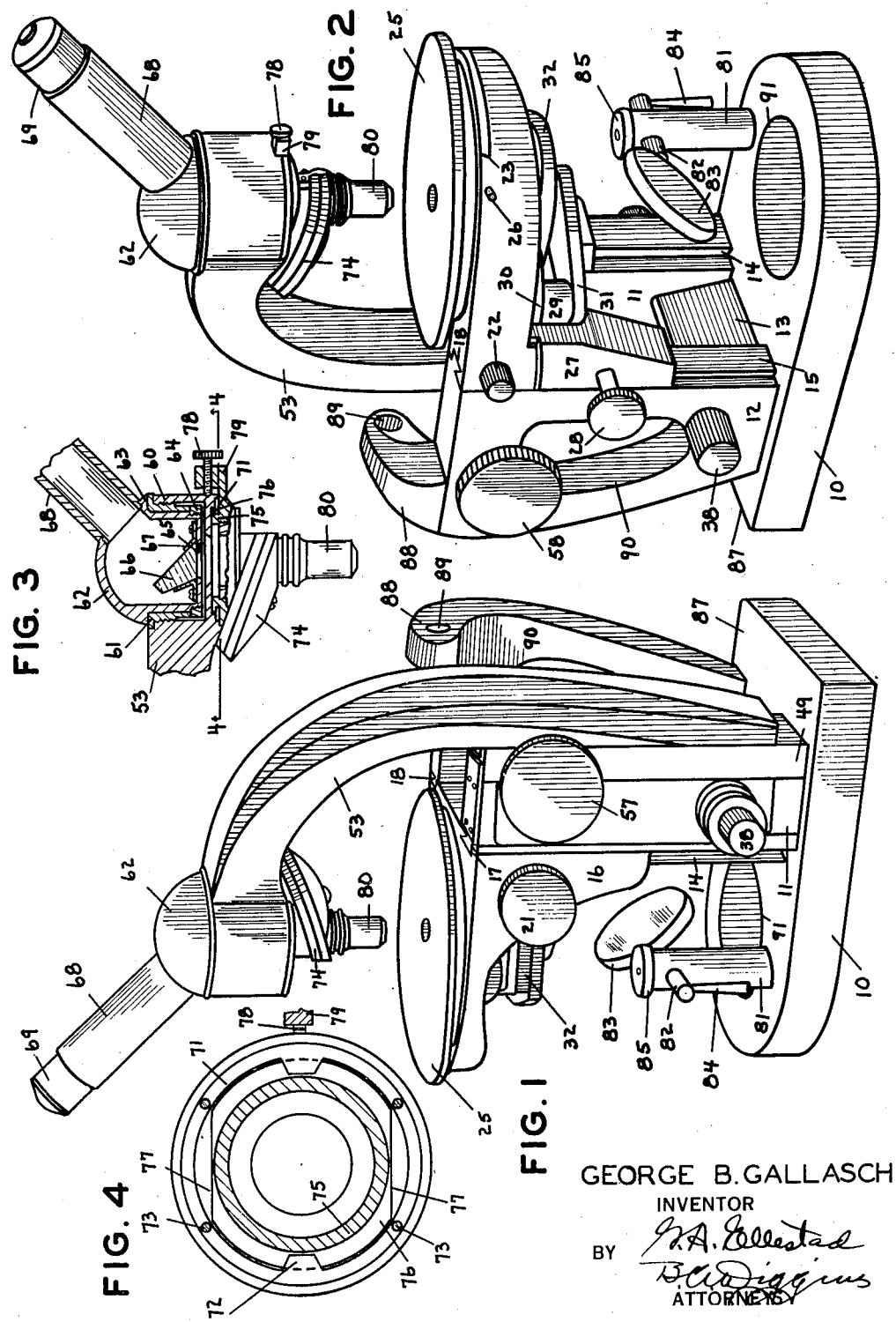
GEORGE B. GALLASCH
INVENTOR Sept. 10, 1940.  G. B. GALLASCH  2,214,367
MICROSCOPE
Filed March 24, 1939  2 Sheets-Sheet 2
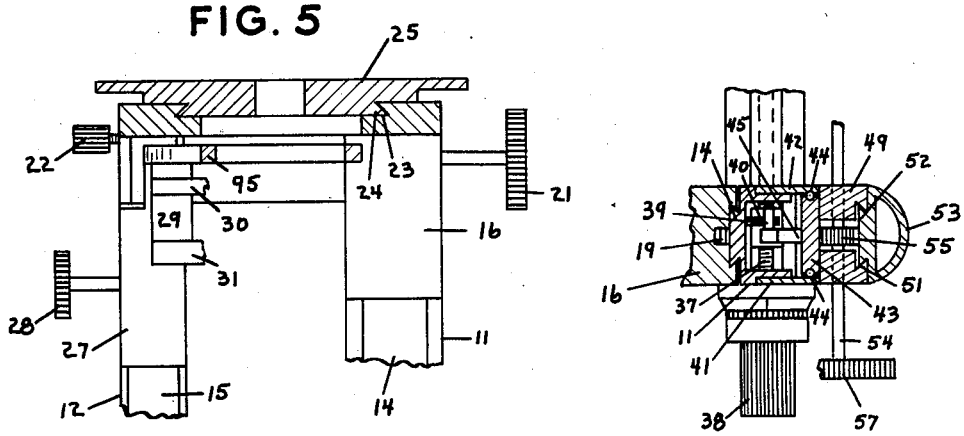
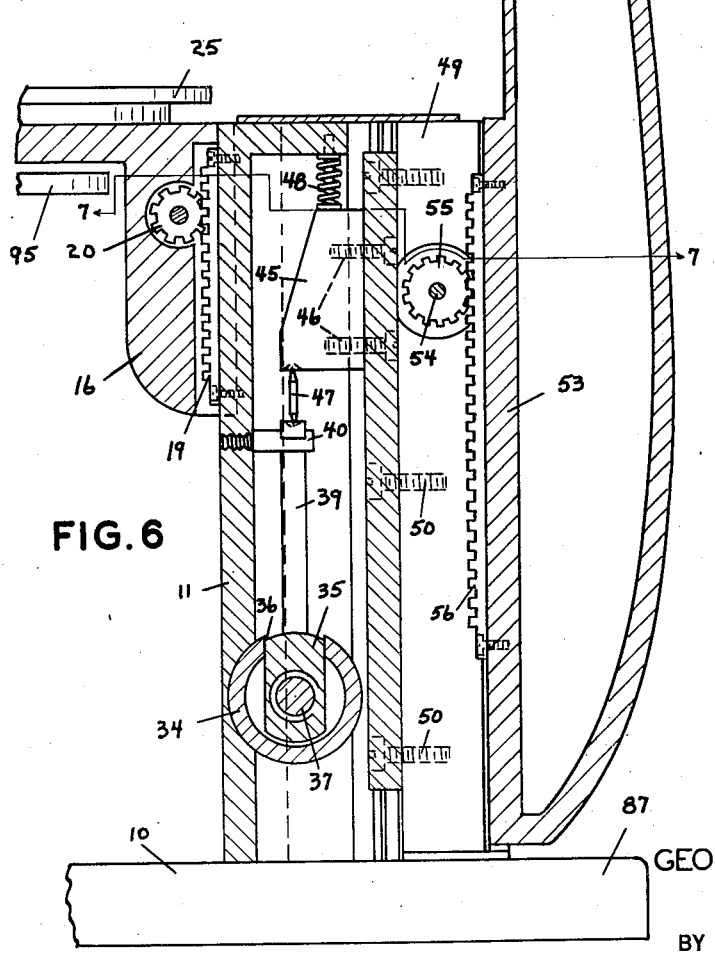
GEORGE B. GALLASCH
INVENTOR
BY
ATTORNEYS Patented Sept. 10, 1940

2,214,367

UNITED STATES PATENT OFFICE 2,214,367

MICROSCOPE

George B. Gallasch, Rochester, N. Y., assignor to Bausch & Lomb Optical Company, Rochester, N. Y., a corporation of New York Application March 24, 1939, Serial No. 263,858

5 Claims. (Cl. 88—39)

The present invention relates to optical instruments and more particularly to microscopes.

One of the objects of the present invention is to provide a new and improved microscope in which the various parts are readily and conveniently adjustable and accessible. Another object is to provide a microscope which may be used in either a horizontal or vertical position. A further object is to provide a microscope in which the adjustable parts are strong and rugged and are maintained in accurate alignment. These and other objects and advantages reside in certain novel features of construction, arrangement and combination of parts as will hereinafter be more fully set forth and pointed out in the appended claims.

Referring to the drawings:

Figs. 1 and 2 are perspective views of a microscope embodying my invention.

Fig. 3 is a vertical section through the body tube.

Fig. 4 is a view taken on line 4—4 of Fig. 3.

Fig. 5 is a vertical section through the stage.

Fig. 6 is a vertical section showing the fine adjustment mechanism.

Fig. 7 is a section taken on line 7—7 of Fig. 6.

A preferred embodiment of my invention is illustrated in the drawing wherein 10 designates the microscope base upon which two parallel upright columns 11 and 12 are secured. These two columns 11 and 12 are spaced from each other to permit the passage of light therebetween. A brace 13 adjacent the base 10 serves to insure the proper spacing between the columns 11 and 12.

The column 11 has a vertical bevelled guide 14 on its front face and a similar guide 15 is formed on the front face of the column 12. A bracket 16 is vertically slidably mounted on the guides 14 and 15 by means of two grooves 17 and 18 corresponding in size and shape to the guides 14 and 15. A suitable rack 19 is secured on the column 11 and a pinion 20, carried by the bracket 16 and controlled by the knob 21 engages the rack 19 and serves to raise and lower the bracket 16. A screw 22 selectively engages the guide 15 to lock the bracket against adjustment. The top of the bracket 16 is formed with a horizontal dovetail groove 23 for receiving the correspondingly shaped projection 24 of a microscope stage 25. The stage 25 may be locked to the bracket by a screw 26. The stage 25 is thus readily removable and a variety of stages, rotary, mechanical or plain can be readily substituted one for the other.

A second bracket 27 is slidably mounted on the guide 15 beneath the bracket 16. This bracket 27 may be raised or lowered by a rack and pinion mechanism, not shown, under the control of the knob 28 and carries a depending post 29 upon which the arms 30 and 31 are swingably mounted. The arm 30 carries the substage diaphragm assembly indicated at 32 and a suitable filter, diaphragm or supplemental lens, such as that shown in U. S. Patent 1,860,430 issued May 31, 1932, to Max Poser for Microscope illuminating means, is mounted on the arm 31. The condenser not shown is removably mounted in a ring 95 fixed on the bracket 27 above the substage diaphragm 32.

The column 11 is hollow and a suitable fine adjustment mechanism is mounted within this hollow column. The fine adjustment mechanism illustrated is similar to that described and claimed in U. S. Patent 2,093,611, issued September 21, 1937, to Henry F. Kurtz, and consists of a hollow tube 34 secured against rotation within the column 11. A nut 35 is slidably but non-rotatably mounted in a slot 36 in the tube 34 and is moved longitudinally of the tube 34 by a screw 37 under the control of knobs 38 conveniently located near the base of the microscope. A bell crank lever 39 is fulcrumed on a knife edge 40 secured within the column 11 and has one arm in contact with the nut 35 so that the actuation of the screw 37 rocks the lever 39.

A pair of gibs 41 and 42 are suitably secured on opposite sides of the column 11 and are provided with parallel, inwardly-facing vertical bearing races. A block 43 positioned between the gibs 41 and 42 has two parallel outwardly-facing, vertical bearing races. The block 43 is secured between the gibs 41 and 42 by a plurality of freely rotatably bearing elements 44 positioned in the bearing races. Several suitable bearing systems are described and claimed in U. S. Patent 2,117,161, issued May 10, 1938, to Henry F. Kurtz and myself for a Microscope.

A projection 45 is secured on the block 43 within the column 11 by screws 46 and this projection is actuated by the lever 39 through a pin 47. A coil spring 48 bears against the top of the projection 45 and thus prevents any lost motion between the screw 37 and block 43 as is known in the art.

An intermediate member 49 is secured to the block 43 by screws 50 and is provided with a vertical dovetail groove 51 within which the dovetail slide 52 of the microscope arm 53 is slidably mounted. A shaft 54 is rotatably mounted in the member 49 and carries a pinion 55. This pinion 55 meshes with a rack 56 secured to the arm 53. Two knobs 57 and 58 are secured on the ends of the shaft 54 for actuating the pinion 55 to raise and lower the arm 53 for coarse adjustment of focus.

The microscope arm 53 extends upwardly and forwardly from the column 11 and terminates in a vertical, cylindrical sleeve 60 directly over the stage 25. A bushing 61 is threaded into the sleeve 60 and carries the rotatable prism housing 62. A shoulder 63 on the housing 62 rests on top of the bushing 61 and a collar 64 threaded on the bottom of the housing 62 prevents withdrawal of the housing from the bushing. The bottom of the housing 62 is formed with an aperture 65 and a suitable prism 66 is suitably secured over this aperture 65 by a mounting 67. An eyepiece tube 68 is threaded through the top wall of the housing 62 in alignment with the prism 66 and carries an ocular 69.

Beneath the housing 62, an annular plate 71 having two inward projections 72, is suitably secured to the sleeve 60 by screws 73. A suitable objective mount such as a rotary nosepiece 74 has a cylindrical portion 75 terminating in an outward flange 76. This flange 76 has portions cut away as indicated at 77 so it can pass between the projections 72. This bayonet lock forms a simple mechanism for rapidly attaching or detaching the nosepiece. A screw 78 threaded in a bracket 79 on the nosepiece 74 engages the wall of the sleeve 60 to prevent accidental detachment of the nosepiece. One or more objectives 80 are secured on the nosepiece 74 in the usual manner.

A vertical lug 81 is rotatably mounted beneath the stage 25 and a horizontal rod 82 carrying the mirror 83 is rotatably mounted in the lug 81. A handle 84 on the rod 82 serves to rock the mirror 83 and a lock nut 85 on top of the lug 81 locks the mirror in adjusted position.

My new microscope can be used with its axis horizontal for photomicrography. For this purpose, the base 10 has a rearwardly extending portion 87 and a rest 88 projects rearwardly from the upright column 12 to the same plane as the portion 88 of the base. This rest 88 is preferably formed with a hole 89 so that it may be readily screwed or bolted to a table. The space between the column 12 and the rest 88 is left open as indicated at 90 to form a convenient carrying handle.

In order to illuminate the microscope in this horizontal position, the base 10 is provided with an opening 91 in alignment with the optical axis of the microscope. This opening 91 also may serve as a seat for a microscope lamp.

From the foregoing, it will be apparent that I am able to attain the objects of my invention and provide a microscope which is simple and rugged in construction yet efficient and accurate in operation. Various structural modifications can, of course, be made in the illustrated embodiment without departing from the spirit of my invention or the scope of the appended claims.

I claim:

1. A microscope comprising a base, two parallel, upright columns secured on said base and spaced apart to permit the passage of light therebetween, said base extending forwardly and rearwardly from said columns, a rearwardly projecting carrying handle secured to one of said columns, an arm vertically slidably mounted on the rear side of the other of said columns, said arm projecting upwardly and forwardly over said columns, a microscope body carried by said arm, a stage carried by said columns and projecting forwardly beneath said microscope body, and a reflector carried by the forwardly extending portion of said base for receiving light from between said columns and directing it upward through said stage to said microscope body.

2. A microscope comprising a base, two parallel upright columns secured on said base in spaced relation to permit the passage of light therebetween, a vertical guide on each column, said guides being parallel and facing in the same direction, a bracket slidably mounted on said guides, a microscope stage carried by said bracket, an arm vertically slidably mounted on one of said columns, said arm projecting forwardly over said stage, a microscope body carried by said arm above said stage, means for sliding said arm on said one of said columns and a reflector carried by said base beneath said bracket for receiving light from between said columns and directing it upward through said stage to said microscope body.

3. A microscope comprising a base, two parallel upright columns secured on said base, said base extending forwardly and rearwardly of said columns, a vertical guide on each column facing the forwardly extending portion of said base, a microscope stage vertically slidably mounted on said guides, a microscope arm vertically slidably mounted on the rearwardly facing side of one of said columns, said arm extending upwardly and forwardly over said stage, a microscope body carried by said arm over said stage, means carried by said one of said columns for sliding said arm for focusing, and a rearward projection carried by said other column, said projection and the rearwardly extending portion of said base serving to support the microscope in horizontal position.

4. A microscope comprising a substantially flat base, two parallel upright columns secured on said base adjacent one end thereof, and spaced apart to permit the passage of light therebetween, a vertical guide on each column, said guides facing in the same direction, a microscope stage slidably mounted on said guides and projecting forwardly therefrom, means carried by said stage and engaging one of said guides for sliding said stage vertically on said guides, a bracket slidably mounted on the other guide beneath said stage, means for sliding said bracket vertically on said guide, a microscope condenser carried by said bracket beneath said stage, a reflector adjustably mounted on said base beneath said condenser for receiving light from between said columns and directing it upward through said condenser and stage, a microscope arm mounted on one of said columns and projecting upwardly and forwardly to a point over said stage, a microscope carried by said arm above said stage for receiving the light directed upward by said reflector and means for adjusting said microscope vertically relative to said stage.

5. A microscope comprising a base, two upright columns secured on said base in spaced relation to permit the passage of light therebetween, said base extending forwardly and rearwardly of said columns, a microscope stage carried by said columns and projecting over the forwardly extending portion of said base, a reflector adjustably mounted on the forwardly extending portion of said base beneath said stage for receiving light from between said columns and directing it upward through said stage, a microscope arm carried by one of said columns and projecting over said stage, an adjustment mechanism mounted in said one of said columns and operatively connected to said arm for raising and lowering said arm, a microscope body tube carried by said arm above said stage for receiving the light directed upward through said stage by said reflector, said base having an aperture therethrough, beneath and in alignment with said stage, means for moving said reflector out of the path between said aperture and said stage and means for supporting said microscope in a horizontal position, the last-named means comprising a carrying handle secured to the other of said columns and projecting rearwardly therefrom, said handle having a portion terminating directly above the rearwardly extending portion of said base.

GEORGE B. GALLASCH.